United States Patent
Kim (10) Patent No.: US 8,710,390 B2
(45) Date of Patent: Apr. 29, 2014

(54) INTERLOCK APPARATUS FOR VACUUM CIRCUIT BREAKER

(75) Inventor: Dae Sung Kim, Cheongju-Si (KR)

(73) Assignee: LSIS Co., Ltd., Anyang-Si, Gyeonggi-Do (KR)

(*) Notice: Subject to any disclaimer, the term of this patent is extended or adjusted under 35 U.S.C. 154(b) by 305 days.

(21) Appl. No.: 13/372,383

(22) Filed: Feb. 13, 2012

(65) Prior Publication Data
US 2012/0217223 A1  Aug. 30, 2012

(30) Foreign Application Priority Data
Feb. 28, 2011  (KR) .......................... 10-2011-0018191

(51) Int. Cl.
*H01H 33/66* (2006.01)
(52) U.S. Cl.
USPC ......................................... 218/140; 361/606
(58) Field of Classification Search
USPC ......................................... 218/140; 361/606
See application file for complete search history.

(56) References Cited

U.S. PATENT DOCUMENTS

| 3,474,201 | A | * | 10/1969 | Bould | 200/50.09 |
| 4,025,747 | A | * | 5/1977 | Bharteey et al. | 200/254 |
| 5,763,844 | A | * | 6/1998 | Seymour et al. | 219/69.13 |
| 7,057,123 | B1 | * | 6/2006 | Jenkins et al. | 200/50.23 |
| 7,724,489 | B2 | * | 5/2010 | Montich | 361/115 |

* cited by examiner

*Primary Examiner* — Truc Nguyen
(74) *Attorney, Agent, or Firm* — Lee, Hong, Degerman, Kang & Waimey (57) ABSTRACT

An interlock apparatus for a vacuum circuit breaker includes a pair of hindering units configured to allow or prevent a motion of a breaker body to an connection position or a disconnection position; a pair of first interlock bars configured to change a width of the breaker body to be greater than the predetermined spacing distance of the hindering units in a first position where the first interlock bars are spaced from each other, or to change the width of the breaker body to be smaller than the predetermined spacing distance; and a second interlock bar vertically movable to an up position and a down position, the up position for moving the first interlock bars to the first position, and the down position for returning the first interlock bars to the second position by being separated from the interposed position between the first interlock bars.

9 Claims, 7 Drawing Sheets

INTERLOCK APPARATUS FOR VACUUM CIRCUIT BREAKER

CROSS-REFERENCE TO RELATED APPLICATION

Pursuant to 35 U.S.C. §119(a), this application claims the benefit of earlier filing date and right of priority to Korean Patent Application No. 10-2011-0018191, filed on Feb. 28, 2011, the contents of which are hereby incorporated by reference herein in its entirety.

BACKGROUND OF THE INVENTION

1. Field of the Invention

The present invention relates to a vacuum circuit breaker, and more particularly, to an interlock apparatus for a vacuum circuit breaker capable of preventing the occurrence of an accident by preventing a breaker body from moving to a connection position (in other words push-in position) for connection to terminals of an enclosure from a disconnection position (in other words draw-out position) for separation from the terminals of the enclosure, or by preventing the breaker body from moving to the disconnection position from the connection position, in a state that a closing spring for a closing operation is charged with elastic energy.

2. Background of the Invention

Generally, a circuit breaker for protecting an electric power circuit and an electric load devices by automatically breaking the circuit upon detection of an abnormal current on the circuit or for switching the electric power circuit, may be categorized into a low voltage circuit breaker for a low voltage less than several hundreds of volts, and a high voltage circuit breaker for a high voltage more than several hundreds of volts according to the size of a rated voltage.

A vacuum circuit breaker is the high voltage circuit breaker and may be categorized into a fixed type vacuum circuit breaker, and a movable type vacuum circuit breaker movable in an enclosure such as an electric power distribution board so as to be connected to or disconnected from the enclosure.

The movable type vacuum circuit breaker is more used worldwide than the fixed type vacuum circuit breaker, since a breaker body can be separated from terminals of an enclosure for test, repair and replacement (movable to a disconnection position) and can be connected to the terminals of the enclosure after test, repair and replacement (movable to a connection position).

For the connection or disconnection, the breaker body is provided with wheels together with a driving device at a lower part thereof.

The draw-out type vacuum circuit breaker has a closing position (ON' position) for supplying an electric power in a state an electric circuit is closed, and a breaking position ('OFF' position or 'TRIP' position) for breaking the electric power supply by making an electric circuit be opened state. Here, the vacuum circuit breaker may be movable to the closing position or the breaking position, by extension of a closing spring or a trip spring for discharging charged energy, respectively. In the occurrence of an abnormal current on the electric power circuit, the circuit has to be instantaneously interrupted. Accordingly, the closing spring and the trip spring have very high elastic energy, respectively.

In the draw-out type vacuum circuit breaker, the breaker body may be separated from terminals of an enclosure for test, repair and replacement, or may be connected to the terminals of the enclosure after test, repair and replacement.

If the closing spring of the vacuum circuit breaker is in a charged state while the breaker body is connected to or disconnected from the enclosure, the elastic energy charged in the closing spring may be discharged. This may result in injury to a user.

SUMMARY OF THE INVENTION

Therefore, a purpose of the present disclosure is to provide an interlock apparatus for a vacuum circuit breaker capable of preventing the occurrence of an accident by preventing a breaker body from moving to a connection position for connection to terminals of an enclosure from a disconnection position for separation from the terminals of the enclosure, or by preventing the breaker body from moving to the disconnection position from the connection position, in a state that a closing spring is charged.

In a vacuum circuit breaker comprising:

an enclosure having terminals connectable to an electric power source or an electric load; a breaker body movable to a connection position for connection to the terminals of the enclosure and to a disconnection position for disconnection from the terminals of the enclosure; and a closing spring installed in the breaker body and having an extended position and a contracted position, the extended position where elastic energy is charged to move the breaker body to a closing position, and the contracted position where elastic energy is discharged, to achieve the purpose of the present disclosure, there is provided an interlock apparatus for the vacuum circuit breaker comprising:

a pair of hindering units fixed to both side walls of the enclosure with a predetermined spacing distance, and configured to allow or prevent a motion of the breaker body to the connection position or the disconnection position by passing only an object having a width smaller than the predetermined spacing distance therethrough;

a pair of first interlock bars horizontal-movably installed at the breaker body, and configured to change a width of the breaker body to be greater than the predetermined spacing distance of the hindering units in a first position where the first interlock bars are spaced from each other, or to change the width of the breaker body to be smaller than the predetermined spacing distance of the hindering units in a second position where the first interlock bars return to be close to each other; and a second interlock bar vertical-movably installed at the breaker body, and up-down movable to an up position and a down position by a pressing or releasing operation of the closing spring according to the extended or contracted position, the up position for moving the first interlock bars to the first position in a pressing manner by being interposed between the first interlock bars, and the down position for returning the first interlock bars to the second position by being separated from the interposed position between the first interlock bars.

According to one aspect of the present disclosure, the interlock apparatus for a vacuum circuit breaker further comprise:

a horizontal slit portion horizontally formed at each of the first interlock bars, and configured to limit a horizontal moving distance of the first interlock bars;

a first guide bolt fixed to a predetermined position of the breaker body, and configured to guide a horizontal motion of the first interlock bars by passing through the horizontal slit portion; and a first return spring having one end supported by the first guide bolt and another end supported by the first interlock bars, and configured to provide elastic force to the first interlock bars such that the first interlock bars return to the second position.

According to another aspect of the present disclosure, the interlock apparatus for a vacuum circuit breaker further comprise:

a vertical slit portion vertically formed at the second interlock bar, and configured to limit a vertical moving distance of the second interlock bar;

a second guide bolt fixed to a predetermined position of the breaker body, and configured to guide a vertical motion of the second interlock bar by passing through the vertical slit portion; and a second return spring having one end supported by the second interlock bar and another end supported by the breaker body, and configured to provide elastic force to the second interlock bar such that the second interlock bar returns to a down position.

According to another aspect of the present disclosure, a contact surface of the second interlock bar with the first interlock bar may be configured as an inclined surface.

According to still another aspect of the present disclosure, the interlock apparatus for a vacuum circuit breaker further comprise a pair of guide pins fixed to predetermined positions of the breaker body, facing each other with a spacing distance therebetween, and configured to allow a vertical motion of the second interlock bar through the space therebetween.

According to still another aspect of the present disclosure, the pair of hindering units may be configured as a pair of protrusion members protruding from both side walls of the enclosure, and facing each other.

According to still another aspect of the present disclosure, the second interlock bar includes:

a pair of operation limitation surfaces vertically formed at an upper part of the second interlock bar so as to face each other, and configured to limit a horizontal moving distance of the first interlock bars; and a pair of inclined surfaces upward extending from the operation limitation surfaces, and upward inclined such that the second interlock bar has a decreased width.

According to still another aspect of the present disclosure, a contact surface of the first interlock bar with the second interlock bar may be configured as an inclined surface or a curved surface.

Further scope of applicability of the present application will become more apparent from the present disclosure given hereinafter. However, it should be understood that the present disclosure and specific examples, while indicating preferred embodiments of the disclosure, are given by way of illustration only, since various changes and modifications within the spirit and scope of the disclosure will become apparent to those skilled in the art from the present disclosure.

BRIEF DESCRIPTION OF THE DRAWINGS

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated.

Hereinafter, a configuration and an operation of an interlock apparatus for a vacuum circuit breaker according to the present invention will be explained with reference to the attached drawings.

Firstly, a configuration and an operation of a vacuum circuit breaker including an interlock apparatus according to the present disclosure will be explained with reference to FIGS. 1 to 4.

Figure 1:
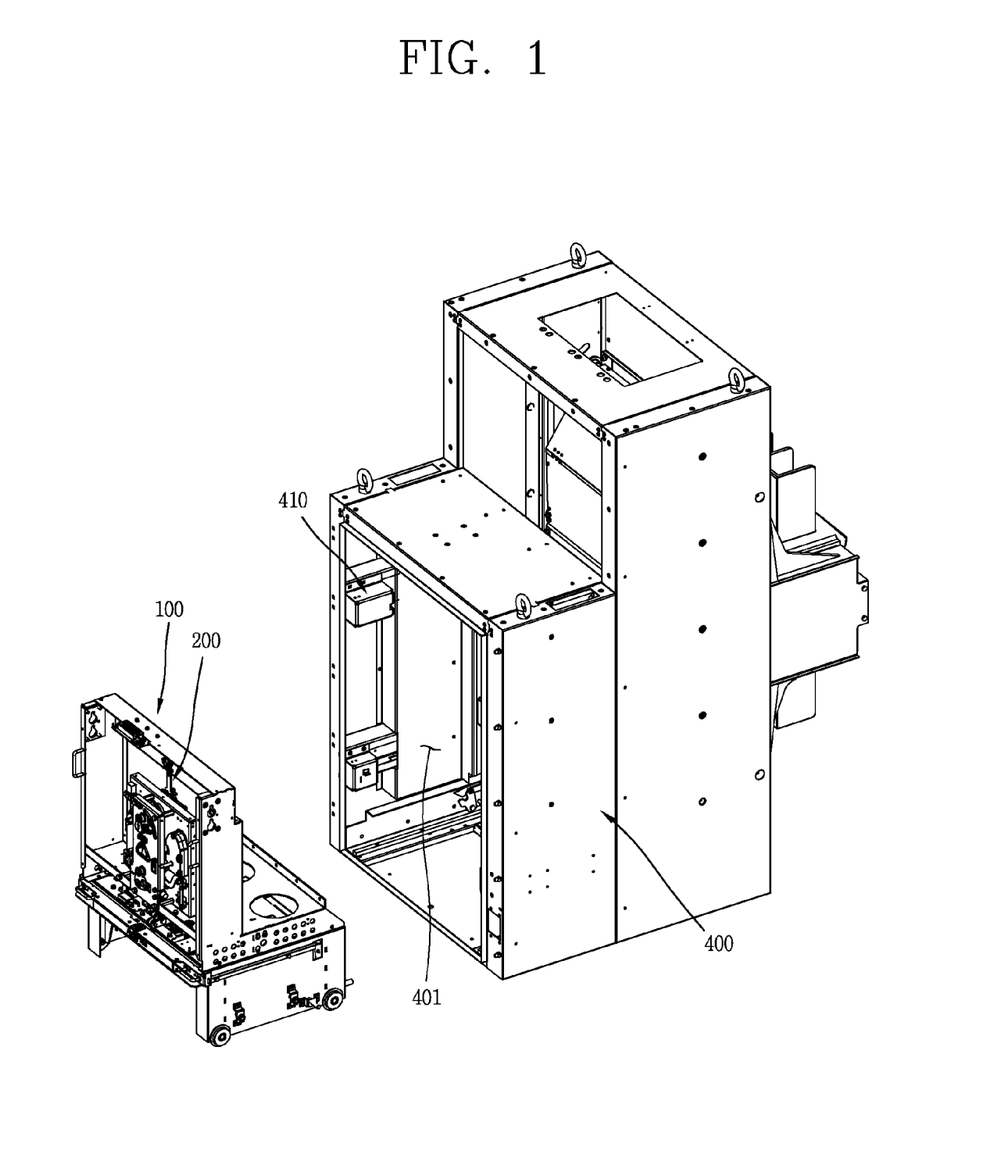
FIG. 1 is a perspective view showing the appearance of a vacuum circuit breaker including a breaker body where an interlock apparatus of the present disclosure has been installed and an enclosure, which shows a disconnection position that the breaker body is separated from the enclosure.
Figure 2:
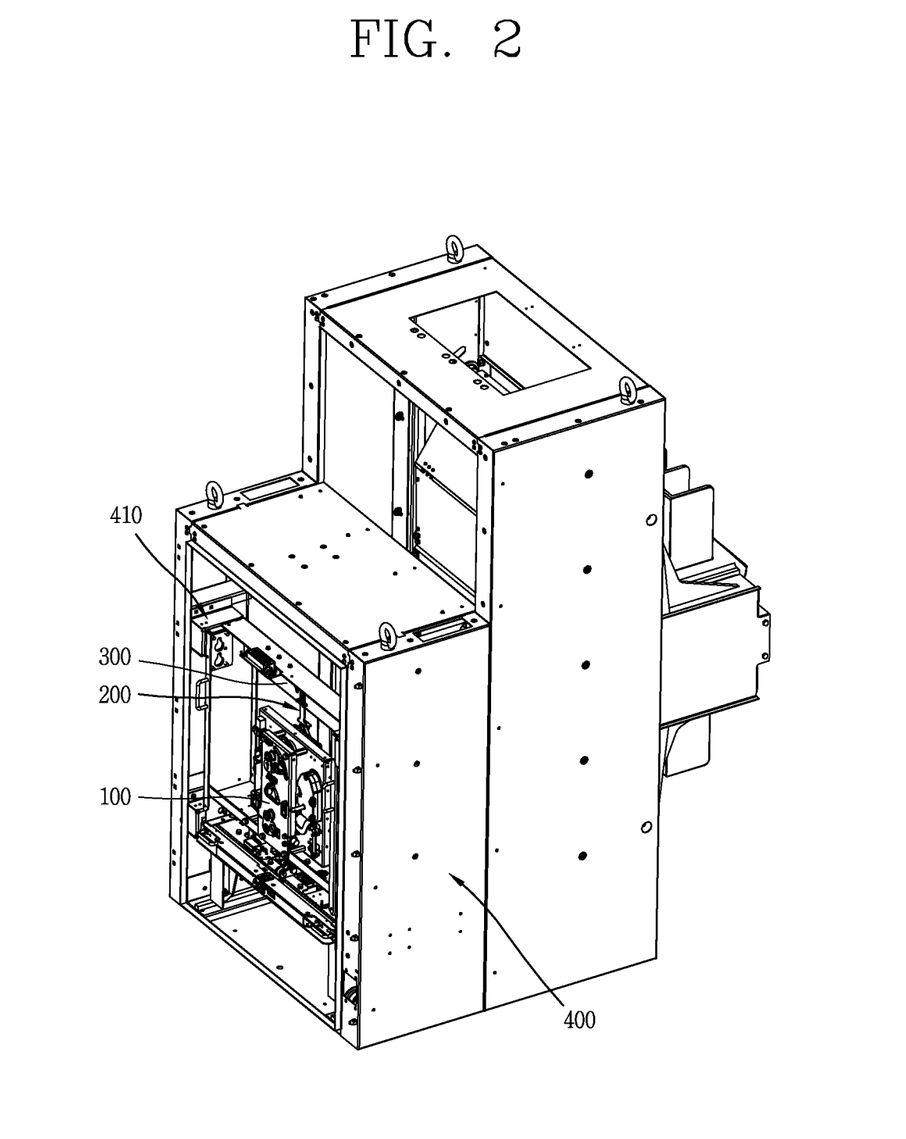
FIG. 2 is a perspective view showing a connection position that the breaker body is installed in the enclosure.

Referring to FIG. 1 or FIG. 2, a vacuum circuit breaker including an interlock apparatus according to the present disclosure comprises an enclosure 400 and a breaker body 100.

The enclosure 400 is a means for accommodating the breaker body 100 movably therein, and has terminals connectable to an electric power source or electric load of an external electric circuit. The terminals may include an external terminal portion connected to the electric power source or electric load, and an inner terminal portion connected to a terminal portion (not shown) of the breaker body 100.

Reference numeral 401 of FIG. 1 designates an installation space in the enclosure 400 where the breaker body 100 is movably installed back and forth.

The breaker body 100 is movable, in the enclosure 400, to a connection position for connection to the terminals, and a disconnection position for disconnection from the terminals. As well-known, the breaker body 100 may include vacuum interrupters, each having a movable contact and a fixed contact in a vacuum container and provided for each phase (pole) of three-phases (three-poles) alternating current (AC), and a driving mechanism for driving the movable contacts of the vacuum interrupters to a circuit closing position or a circuit opening position. The driving mechanism may include a closing spring 110 of FIG. 4, a trip spring (not shown), a plurality of links and levers, latches.

Figure 4:
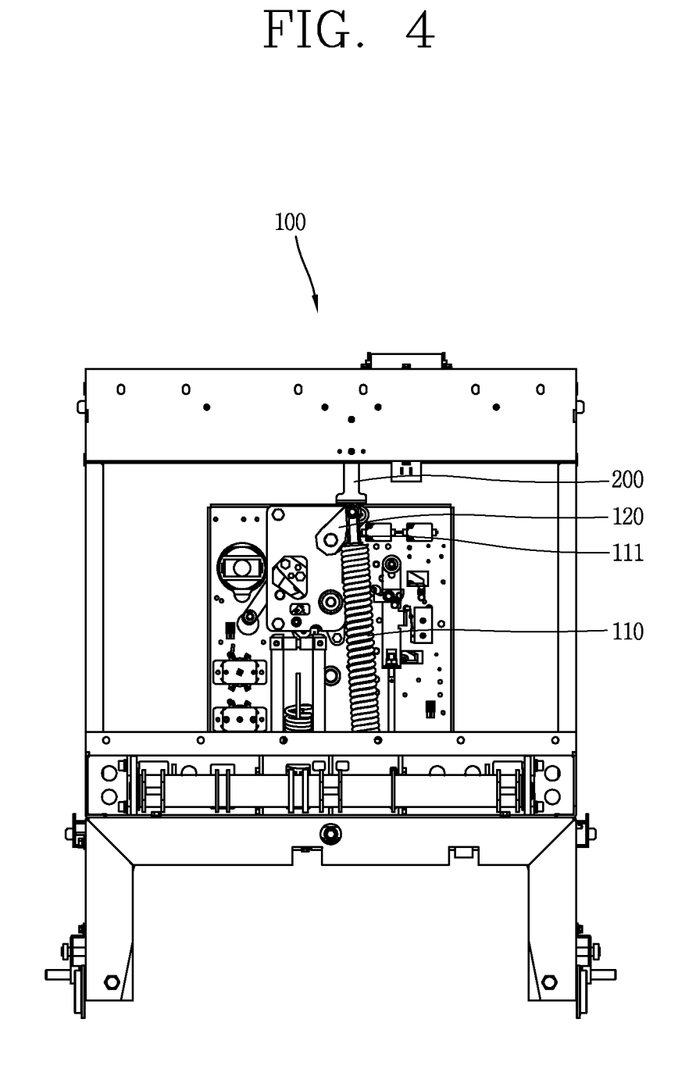
FIG. 4 is a rear view showing configurations of an interlock apparatus for a vacuum circuit breaker, and a breaker body according to the present disclosure.

The closing spring 110 of FIG. 4 is installed in the breaker body 100, and has an extended position where elastic energy is charged and a contracted position where elastic energy is discharged. Here, the elastic energy is charged for implementation of a closing position where the movable contact of the vacuum interrupter of the breaker body 100 contacts the fixed contact.

Figure 5:
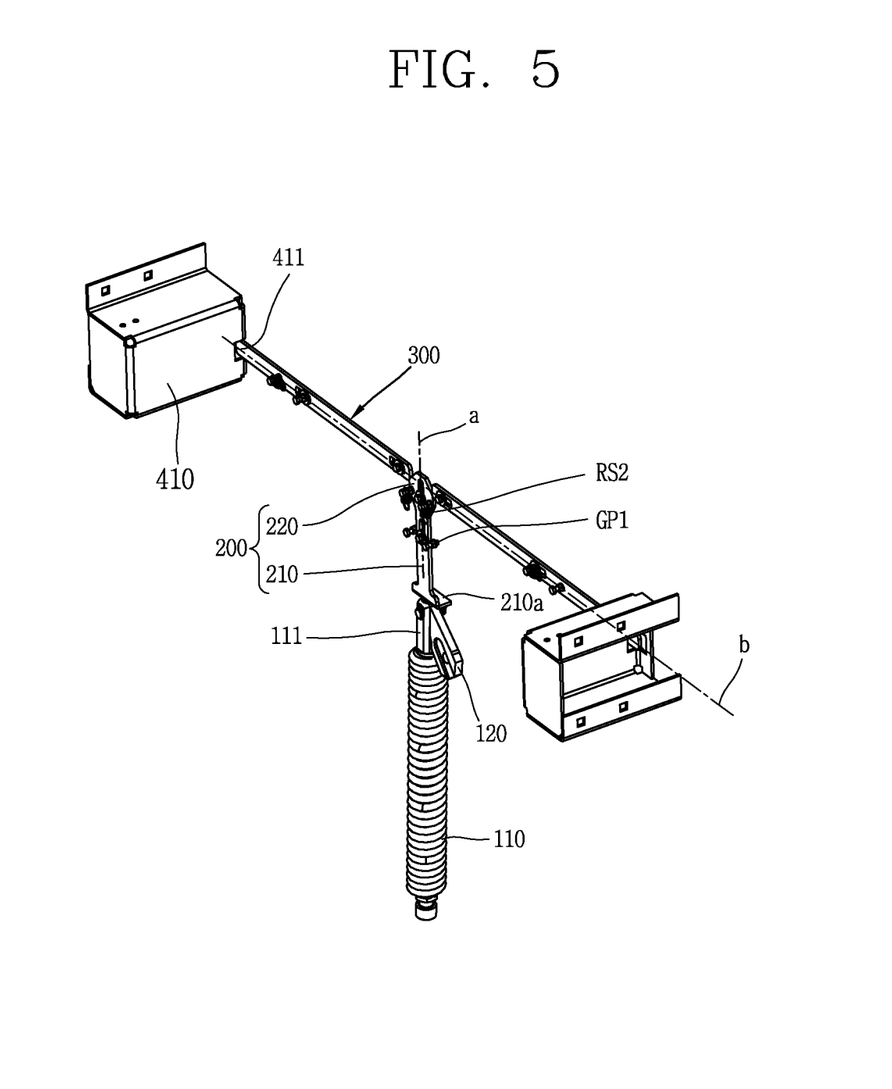
FIG. 5 is a perspective view showing only an interlock apparatus for a vacuum circuit breaker according to the present disclosure.
Figure 6:
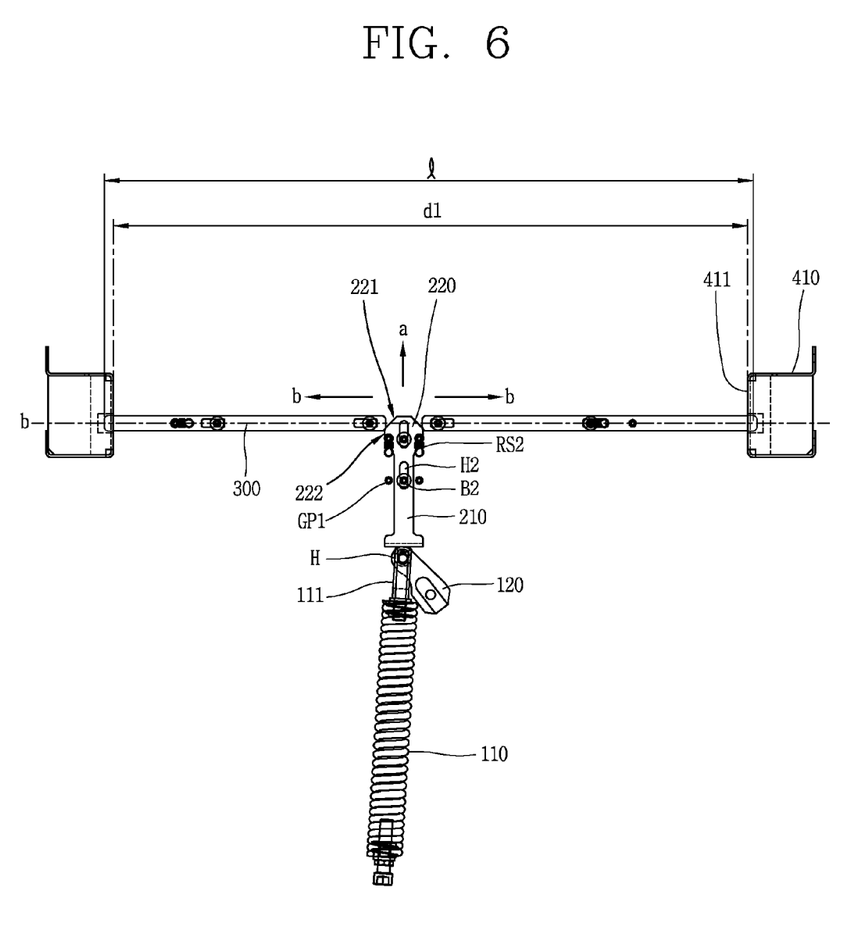
FIG. 6 is a front view showing only an interlock apparatus for a vacuum circuit breaker according to the present disclosure.

As shown in FIGS. 5 and 6, the closing spring 110 is installed in an upright state.

Reference numeral 111 of FIG. 4 designates an operation end of the closing spring 110, and 120 designates a lever rotatable to connect the aforementioned links and levers to the closing spring 110.

The interlock apparatus according to the present disclosure includes a pair of hindering units 410, a pair of first interlock bars 300, and a second interlock bar 200.

The pair of hindering units 410 are fixed to both side walls of the enclosure 400 with a predetermined spacing distance (refer to 'd1' in FIG. 6), and is configured to allow or prevent a motion of the breaker body 100 to an connection position or a disconnection position by passing only an object having a width smaller than the predetermined spacing distance (d1) therethrough.

The pair of hindering units 410 may be configured as a pair of protrusion members protruding from both side walls of the enclosure 400, and facing each other. Referring to FIG. 5, each of the hindering units 410 may be configured as an approximate rectangular parallelepiped shape having an open bottom and an open side surface. And, each of the hindering units 410 may have a pair of flanges provided with fixing bolt openings for fixing the hindering units 410 to the both side walls of the enclosure 400.

Reference numeral 411 of FIG. 5 designates facing surfaces of the pair of hindering units 410.

Figure 3:
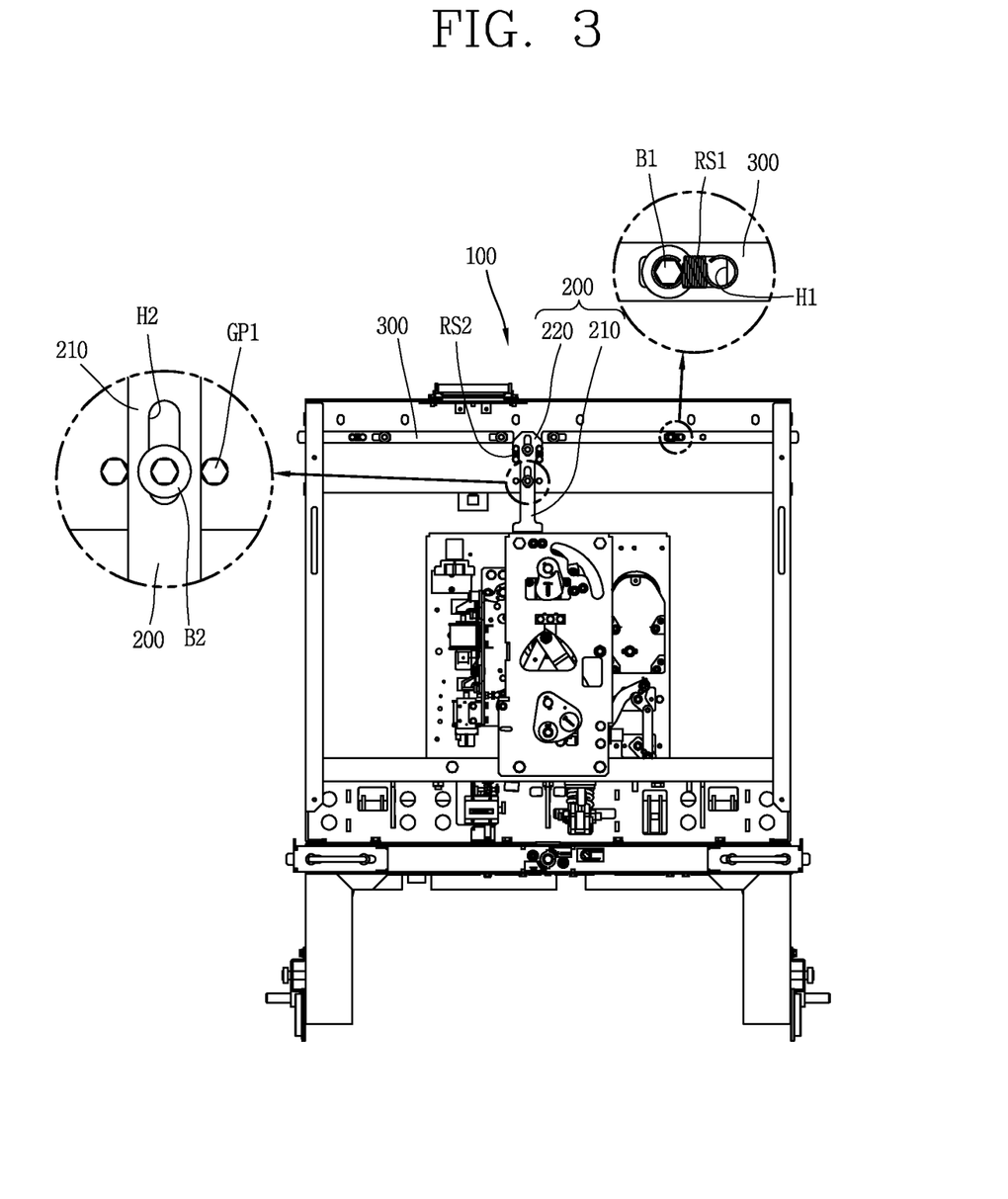
FIG. 3 is a front view showing configurations of an interlock apparatus for a vacuum circuit breaker, and a breaker body according to the present disclosure.

As shown in FIG. 3, the pair of first interlock bars 300 are installed at the breaker body 100 so as to be movable in a horizontal direction. The first interlock bars 300 are configured to change a width of the breaker body 100 to be greater than the predetermined spacing distance (d1) of the hindering units 410 in a first position where the first interlock bars 300 are spaced from each other, and to change the width of the breaker body 100 to be smaller than the predetermined spacing distance (d1) of the hindering units 410 in a second position where the first interlock bars 300 return to be close to each other.

The second interlock bar 200 is up-down movable to an up position and a down position by a pressing or releasing operation of the closing spring 110 according to the extended or contracted position. Here, the up position indicates a position for moving the first interlock bars 300 to the first position in a pressing manner as the second interlock bar 200 is interposed between the first interlock bars 300, and the down position indicates a position for returning the first interlock bars 300 to the second position as the second interlock bar 200 is separated from the interposed position between the first interlock bars 300. The second interlock bar 200 is installed at the breaker body 100 so as to be vertically movable.

As shown in the two-dot chain line of FIG. 3, the interlock apparatus according to the present disclosure further includes a horizontal slit portion (H1), a first guide bolt (B1) and a first return spring (RS1).

The horizontal slit portion (H1) is horizontally formed at each of the first interlock bars 30, and is configured to limit a horizontal moving distance of the first interlock bars 300. In this preferred embodiment, the horizontal slit portion (H1) may be formed in two at each of the first interlock bars 300.

The first guide bolt (B1) is fixed to a predetermined position of the breaker body 100, and is configured to guide a horizontal motion of the first interlock bars 300 by passing through the horizontal slit portion (H1).

The first return spring (RS1) has one end supported by the first guide bolt (B1) and another end supported by the first interlock bars 300, and is configured to provide elastic force to the first interlock bars 300 so that the first interlock bars 300 may return to the second position.

According to another embodiment of the present disclosure, as shown in FIG. 3, the interlock apparatus for a vacuum circuit breaker further includes a vertical slit portion (H2), a second guide bolt (B2) and a second return spring (RS2).

The vertical slit portion (H2) is vertically formed at the second interlock bar 200, and is configured to limit a vertical moving distance of the second interlock bar 200.

The second guide bolt (B2) is fixed to a predetermined position of the breaker body 100, and is configured to guide a vertical motion of the second interlock bar 200 by passing through the vertical slit portion (H2).

The second return spring (RS2) has one end supported by the second interlock bar 200 and another end supported by the breaker body 100, and is configured to provide elastic force to the second interlock bar 200 so that the second interlock bar 200 may return to the down position.

As shown in the two-dot chain line of FIG. 3, the interlock apparatus according to another embodiment of the present disclosure may further include a pair of guide pins (GP1).

The pair of guide pins (GP1) are fixed to predetermined positions of the breaker body 100, facing each other with a spacing distance therebetween, and are configured to allow a vertical motion of the second interlock bar 200 through the space therebetween.

The interlock apparatus according to the present disclosure will be explained with reference to FIGS. 5 to 7.

Referring to FIG. 5, the second interlock bar 200 includes an upper head portion 220 and a lower body portion 210.

The upper head portion 220 is configured to contact and press the first interlock bars 300, and the lower body portion 210 is configured to receive driving power for upward moving from the closing spring 110 disposed therebelow.

As shown in FIG. 5, a lower end of the lower body portion 210 includes a horizontally-bent portion 210a for enhancing the efficiency of power transmission by widening a contact area with an upper end of the closing spring 110.

Figure 7:
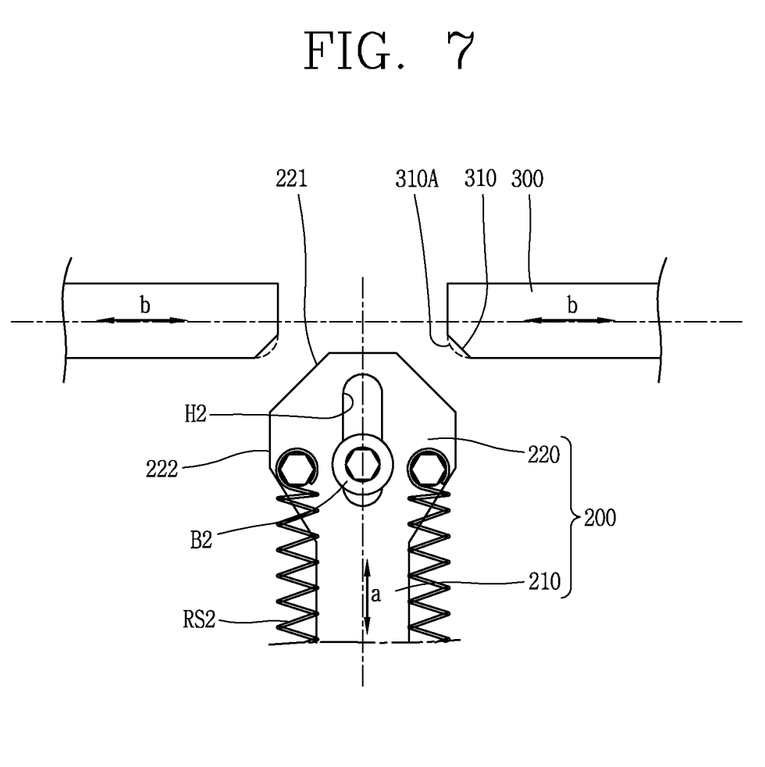
FIG. 7 is a partially-enlarged front view showing configurations of first interlock bars and a second interlock bar of an interlock apparatus for a vacuum circuit breaker according to the present disclosure.

As shown in FIG. 7, a contact surface of the upper head portion 220 of the second interlock bar 200 with the first interlock bars 300 is configured as an inclined surface 221.

As shown in FIG. 7, the upper head portion 220 of the second interlock bar 200 includes a pair of operation limitation surfaces 222, and a pair of inclined surfaces 221.

The pair of operation limitation surfaces 222 are vertically formed at the upper head portion 220 of the second interlock bar 200 so as to face each other, and are configured to limit a horizontal moving distance of the first interlock bars 300. That is, when the first interlock bars 300 are pressed by the operation limitation surfaces 222, the first interlock bars 300 move to be spaced from each other by a width of one inclined surface 221 of the second interlock bar 200 (moved to the direction of 'b'). On the other hand, when the first interlock bars 300 come in contact with the operation limitation surfaces 222, the horizontal motion of the first interlock bars 300 is stopped.

The pair of inclined surfaces 221 upward extend from the operation limitation surfaces 222, and are inclined so that the width of the second interlock bar 200 can decrease toward the upper side.

As shown in FIG. 7, each of the first interlock bars 300 contacting the second interlock bar 200 may include an inclined surface 310 and a curved surface 310A in correspondence to the pair of operation limitation surfaces 222 and the pair of inclined surfaces 221 of the second interlock bar 200.

Referring to FIGS. 5 to 7, reference numeral 'a' designates a moving direction of the second interlock bar 200, i.e., a vertical direction, and reference numeral 'b' designates a moving direction of the first interlock bars 300, i.e., a horizontal direction.

The operation of the interlock apparatus for a vacuum circuit breaker according to the present disclosure will be explained.

Firstly, will be explained an operation to move the breaker body 100 to a disconnection position (draw-out position) from a connection position (push-in position) of FIG. 2 where the breaker body 100 has been installed in the enclosure 400 so as to be connected to the terminals of the enclosure 400.

If the closing spring 110 is in an upward-extended state to be charged with elastic energy, the second interlock bar 200 contacting the upper end of the closing spring 110 upward moves as shown in FIG. 5.

In this case, the first interlock bars 300 come in contact with the second interlock bar 200 which is upward moving, or are pressed by the second interlock bar 200. As a result, the first interlock bars 300 move to be spaced from each other (move to the direction of 'b').

Referring to FIG. 6, the width (l) of the breaker body determined by the first interlock bars 300 having horizontally moved to be spaced from each other becomes greater than the spacing distance (d1) between the two hindering units 410.

In the state that the closing spring 110 is charged with elastic energy, the first interlock bars 300 are stopped by being locked by the hindering units 410. This may prevent the breaker body 100 from moving to the disconnection position (draw-out position).

If the closing spring 110 is in a downward-contracted state to discharge elastic energy, the second interlock bar 200 downward moves due to its weight and elastic force of the second return spring (RS2), from the up position shown in FIG. 5 or FIG. 6.

As a result, the first interlock bars 300 do not come in contact with the second interlock bar 200 which is downward moving any longer, and are not pressed by the second interlock bar 200 any longer. Accordingly, the first interlock bars 300 horizontally move to be close to each other (move to the direction of 'b') by elastic force of the first return spring (RS1) of FIG. 3.

The width (l) of the breaker body determined by the first interlock bars 300 having horizontally moved to be close to each other becomes smaller than the spacing distance (d1) between the two hindering units 410.

In the state that the closing spring 110 discharged the elastic energy, the first interlock bars 300 which determine the width of the breaker body 100 are not stopped by the hindering units 410. This may allow the breaker body 100 to move to the disconnection position (draw-out position).

Secondly, will be explained an operation to move the breaker body 100 to a connection position (push-in position) from a disconnection position (draw-out position) of FIG. 2 where the breaker body 100 has been drawn-out from the enclosure 400.

If the closing spring 110 is in an upward-extended state to be charged with elastic energy, the second interlock bar 200 contacting the upper end of the closing spring 110 upward moves as shown in FIG. 5 or FIG. 6.

In this case, the first interlock bars 300 come in contact with the second interlock bar 200 which is upward moving, or are pressed by the second interlock bar 200. As a result, the first interlock bars 300 move to be spaced from each other (move to the direction of 'b').

Referring to FIG. 6, the width (l) of the breaker body determined by the first interlock bars 300 having horizontally moved to be spaced from each other becomes greater than the spacing distance (d1) between the two hindering units 410.

In the state that the closing spring 110 is charged with elastic energy, the first interlock bars 300 are locked by being stopped by the hindering units 410. This may prevent the breaker body 100 from moving to the connection position (push-in position).

If the closing spring 110 is in a downward-contracted state to discharge elastic energy, the second interlock bar 200 downward moves due to its weight and elastic force of the second return spring (RS2), from the up position shown in FIG. 5 or FIG. 6.

As a result, the first interlock bars 300 do not come in contact with the second interlock bar 200 any longer which is downward moving, and are not pressed by the second interlock bar 200 any longer. Accordingly, the first interlock bars 300 horizontally move to be close to each other (move to the direction of 'b') by elastic force of the first return spring (RS1) of FIG. 3.

The width (l) of the breaker body determined by the first interlock bars 300 having horizontally moved to be close to each other becomes smaller than the spacing distance (d1) between the two hindering units 410.

In the state that the closing spring 110 discharged the elastic energy, the first interlock bars 300 which determine the width of the breaker body 100 are not stopped by the hindering units 410. This may allow the breaker body 100 to move to the connection position (push-in position).

As aforementioned, in the interlock apparatus for a vacuum circuit breaker according to the present disclosure, the breaker body 100 may be prevented from moving to the connection position or the disconnection position in a state that the closing spring 110 is charged with elastic energy. This may prevent the occurrence of an accidence due to discharge of the closing spring 110 while the breaker body 100 moves.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. In a vacuum circuit breaker comprising:
an enclosure having terminals connectable to an electric power source or an electric load; a breaker body movable to a connection position for connection to the terminals of the enclosure and to a disconnection position for disconnection from the terminals of the enclosure; and a closing spring installed in the breaker body and having an extended position and a contracted position, the extended position where elastic energy is charged to move the breaker body to a closing position, and the contracted position where elastic energy is discharged, an interlock apparatus for the vacuum circuit breaker comprising:

a pair of hindering units fixed to both side walls of the enclosure with a predetermined spacing distance, and configured to allow or prevent a motion of the breaker body to the connection position or the disconnection position by passing only an object having a width smaller than the predetermined spacing distance therethrough;

a pair of first interlock bars horizontal-movably installed at the breaker body, and configured to change a width of the breaker body to be greater than the predetermined spacing distance of the hindering units in a first position where the first interlock bars are spaced from each other, or to change the width of the breaker body to be smaller than the predetermined spacing distance of the hindering units in a second position where the first interlock bars return to be close to each other; and a second interlock bar vertical-movably installed at the breaker body, and up-down movable to an up position and a down position by a pressing or releasing operation of the closing spring according to the extended or contracted position, the up position for moving the first interlock bars to the first position in a pressing manner by being interposed between the first interlock bars, and the down position for returning the first interlock bars to the second position by being separated from the interposed position between the first interlock bars.

2. The interlock apparatus for a vacuum circuit breaker according to claim 1, the interlock apparatus further comprising:

a horizontal slit portion horizontally formed at each of the first interlock bars, and configured to limit a horizontal moving distance of the first interlock bars;

a first guide bolt fixed to a predetermined position of the breaker body, and configured to guide a horizontal motion of the first interlock bars by passing through the horizontal slit portion; and a first return spring having one end supported by the first guide bolt and another end supported by the first interlock bars, and configured to provide elastic force to the first interlock bars such that the first interlock bars return to the second position.

3. The interlock apparatus for a vacuum circuit breaker according to claim 1, wherein the interlock apparatus further comprising:

a vertical slit portion vertically formed at the second interlock bar, and configured to limit a vertical moving distance of the second interlock bar;

a second guide bolt fixed to a predetermined position of the breaker body, and configured to guide a vertical motion of the second interlock bar by passing through the vertical slit portion; and a second return spring having one end supported by the second interlock bar and another end supported by the breaker body, and configured to provide elastic force to the second interlock bar such that the second interlock bar returns to the down position.

4. The interlock apparatus for a vacuum circuit breaker according to claim 1, wherein a contact surface of the second interlock bar with the first interlock bar is configured as an inclined surface.

5. The interlock apparatus for a vacuum circuit breaker according to claim 1, wherein the interlock apparatus further comprises a pair of guide pins fixed to predetermined positions of the breaker body, facing each other with a distance therebetween, and configured to allow a vertical motion of the second interlock bar through the space therebetween.

6. The interlock apparatus for a vacuum circuit breaker according to claim 1, wherein the pair of hindering units are configured as a pair of protrusion members protruding from both side walls of the enclosure, and facing each other.

7. The interlock apparatus for a vacuum circuit breaker according to claim 1, wherein the second interlock bar comprises:

a pair of operation limitation surfaces vertically formed at an upper part of the second interlock bar so as to face each other, and configured to limit a horizontal moving distance of the first interlock bars; and a pair of inclined surfaces upward extending from the operation limitation surfaces, and upward inclined such that the second interlock bar has a decreased width.

8. The interlock apparatus for a vacuum circuit breaker according to claim 7, wherein a contact surface of the first interlock bar with the second interlock bar is configured as an inclined surface or a curved surface.

9. The interlock apparatus for a vacuum circuit breaker according to claim 1, wherein the second interlock bar comprises:

an upper head portion configured to press the first interlock bars;

a lower body portion configured to receive driving power for upward moving from the closing spring disposed therebelow; and a horizontally-bent portion bent at a lower end of the lower body portion, so as to enhance efficiency of power transmission by widening a contact area with an upper end of the closing spring.

* * * * *